United States Patent [19]

Zabel

[11] 4,257,394
[45] Mar. 24, 1981

[54] PRESSURE COOKER

[75] Inventor: Herbert E. Zabel, Wheaton, Ill.

[73] Assignee: American Home Products Corporation, New York, N.Y.

[21] Appl. No.: 64,102

[22] Filed: Aug. 6, 1979

[51] Int. Cl.³ .................. A47J 27/00; H05B 1/00; B67D 5/08

[52] U.S. Cl. .................. 126/374; 220/316; 222/70; 126/388

[58] Field of Search ............ 126/345, 388, 387, 377, 126/376, 374, 373; 99/330, 336, 327, 325; 222/70; 220/316

[56] References Cited

U.S. PATENT DOCUMENTS

| Re. 23,709 | 9/1953 | Page | 126/376 |
|---|---|---|---|
| 1,421,517 | 7/1922 | Malcamp | 126/388 X |
| 2,162,600 | 3/1940 | Lurtz | 126/388 |
| 3,738,354 | 1/1973 | Aries | 126/388 |

Primary Examiner—Samuel Scott
Assistant Examiner—G. Anderson
Attorney, Agent, or Firm—Robert D. Teichert

[57] ABSTRACT

A pressure-cooker comprising a pot and a lid each having flange portions for interconnection thereof through rotation of the lid relative to the pot, with locking means formed in the flanges for preventing reverse relative rotation of the lid if pressure of a predetermined value is present in the pressure-cooker. A spring actuated relief valve provided in the lid and a timer mechanism for loading the spring for a designated period of time whereby pressure of a predetermined value is maintained in the pressure-cooker during such period of time.

7 Claims, 27 Drawing Figures

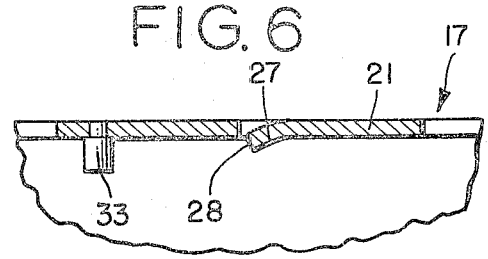
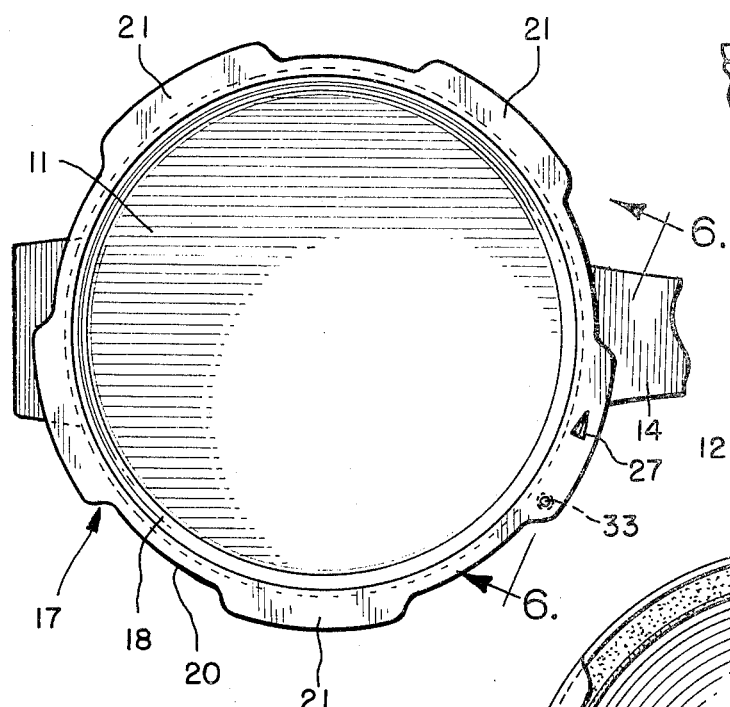
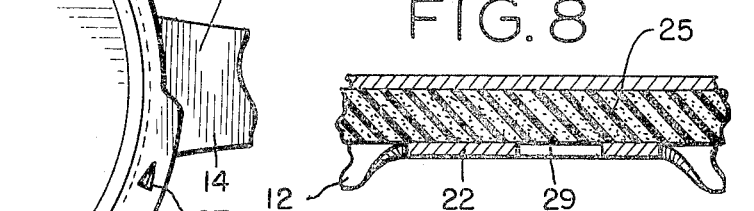
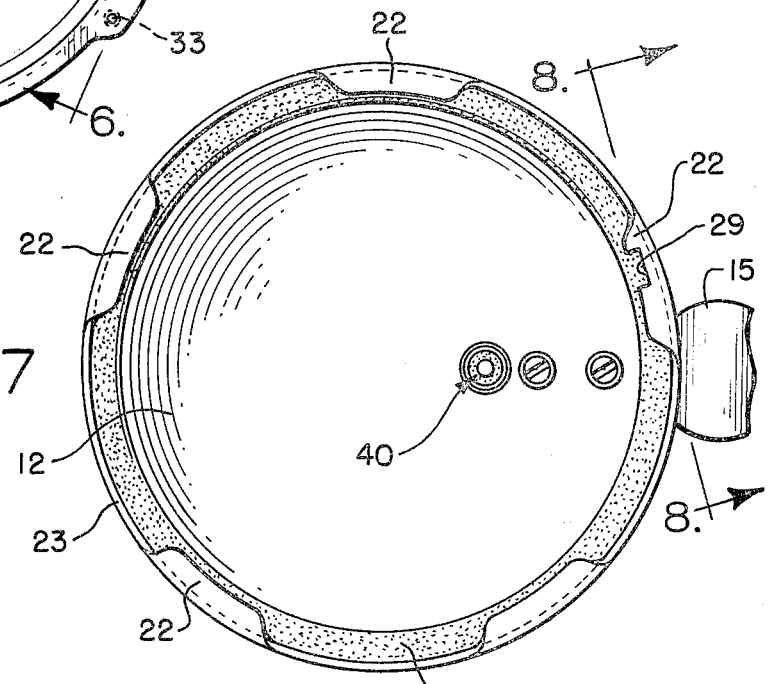
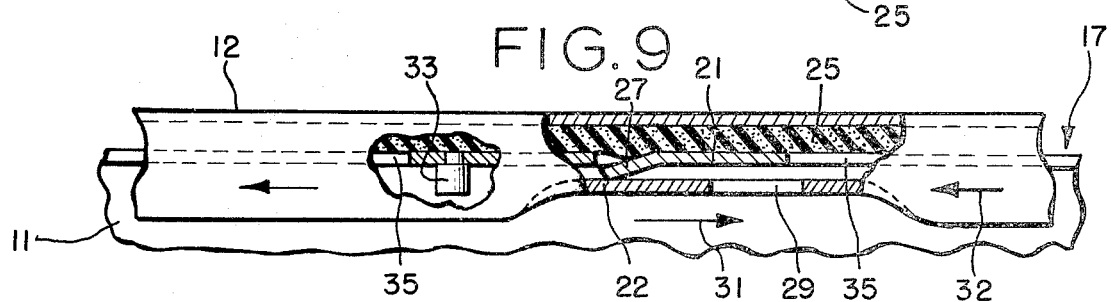
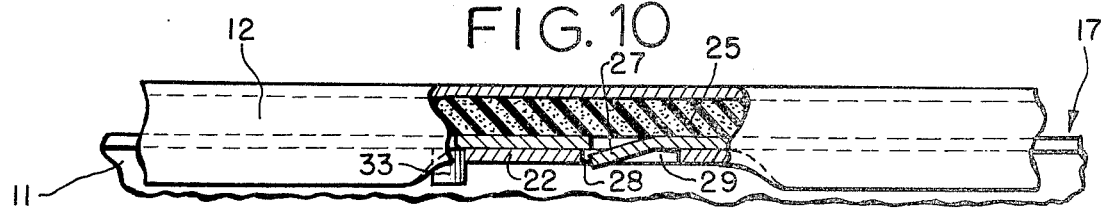

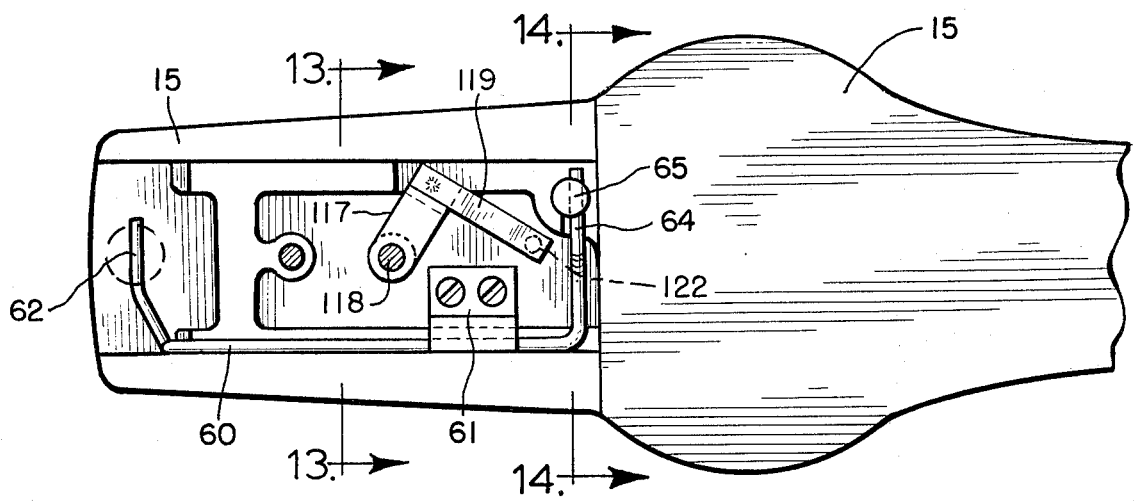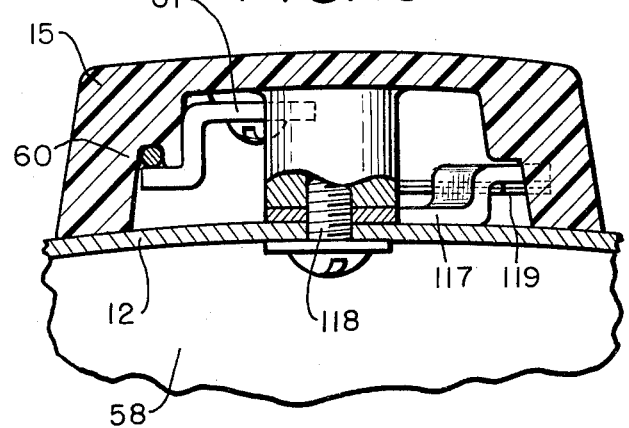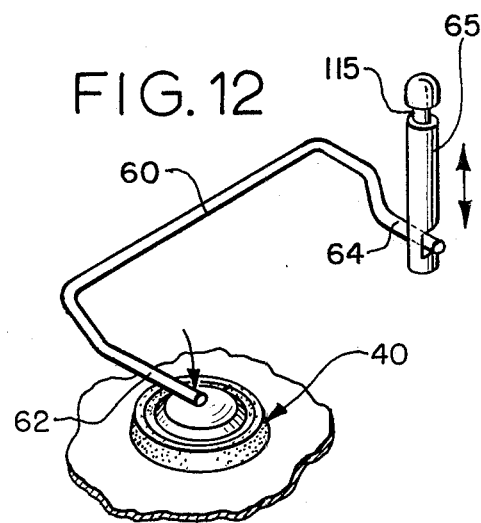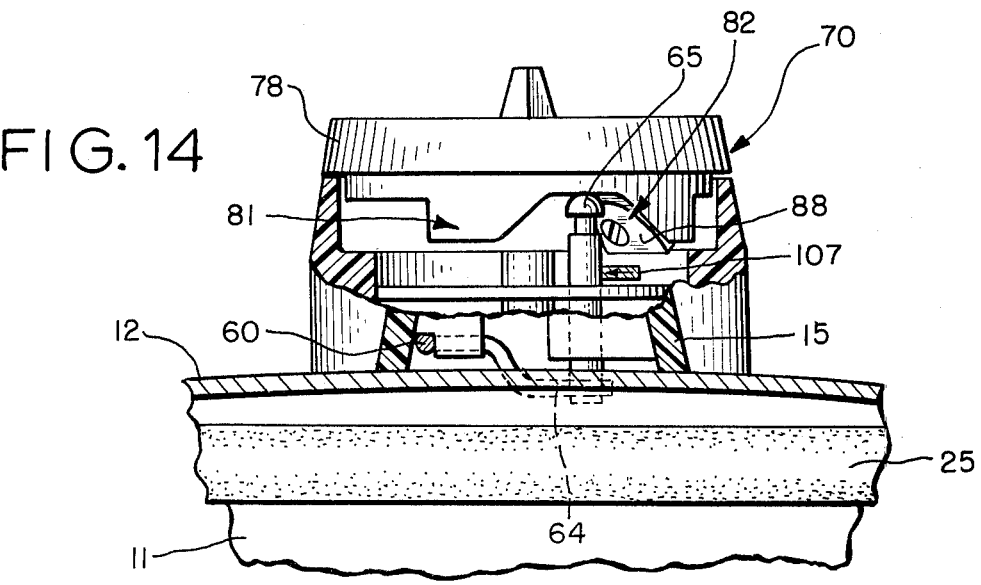

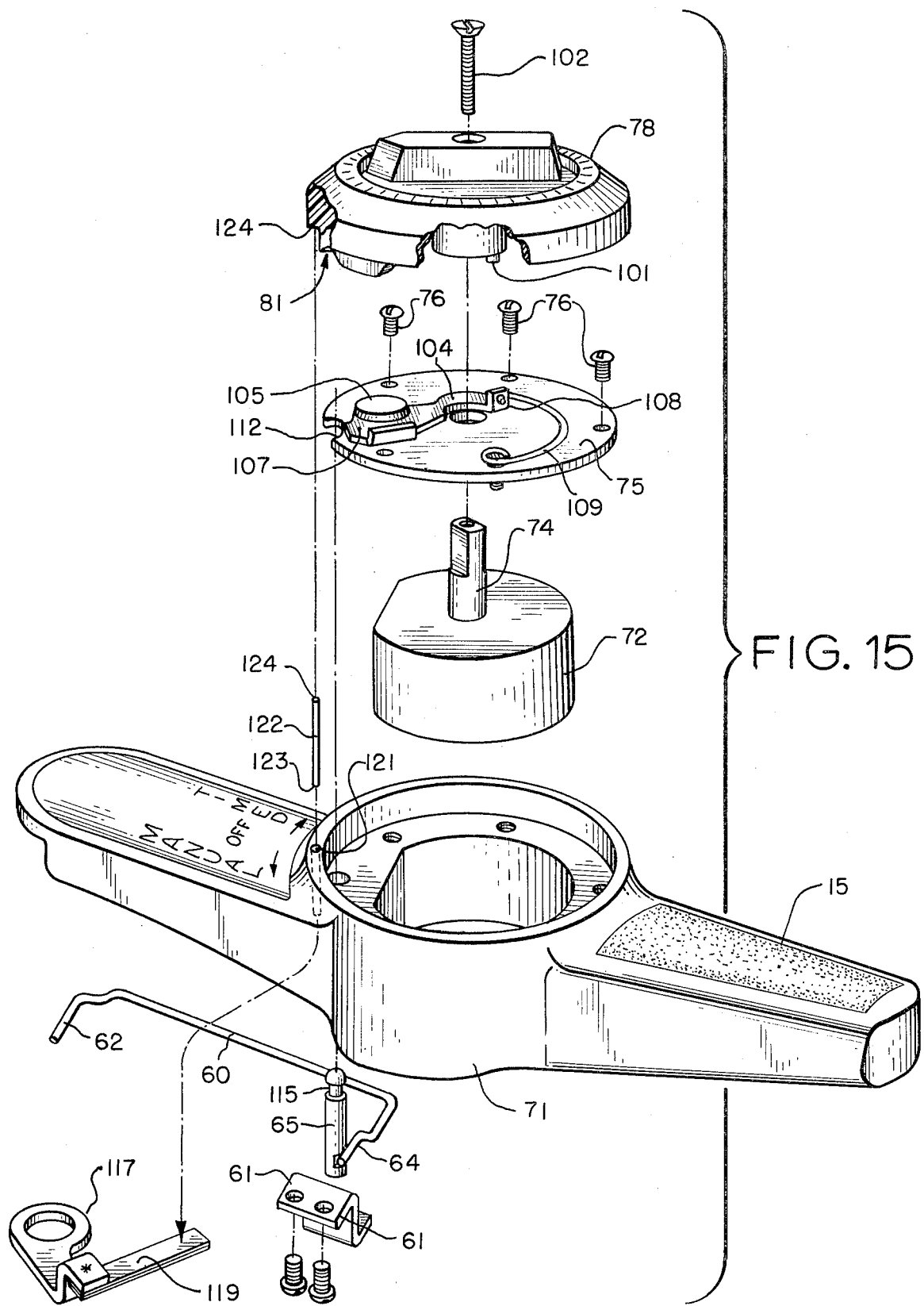

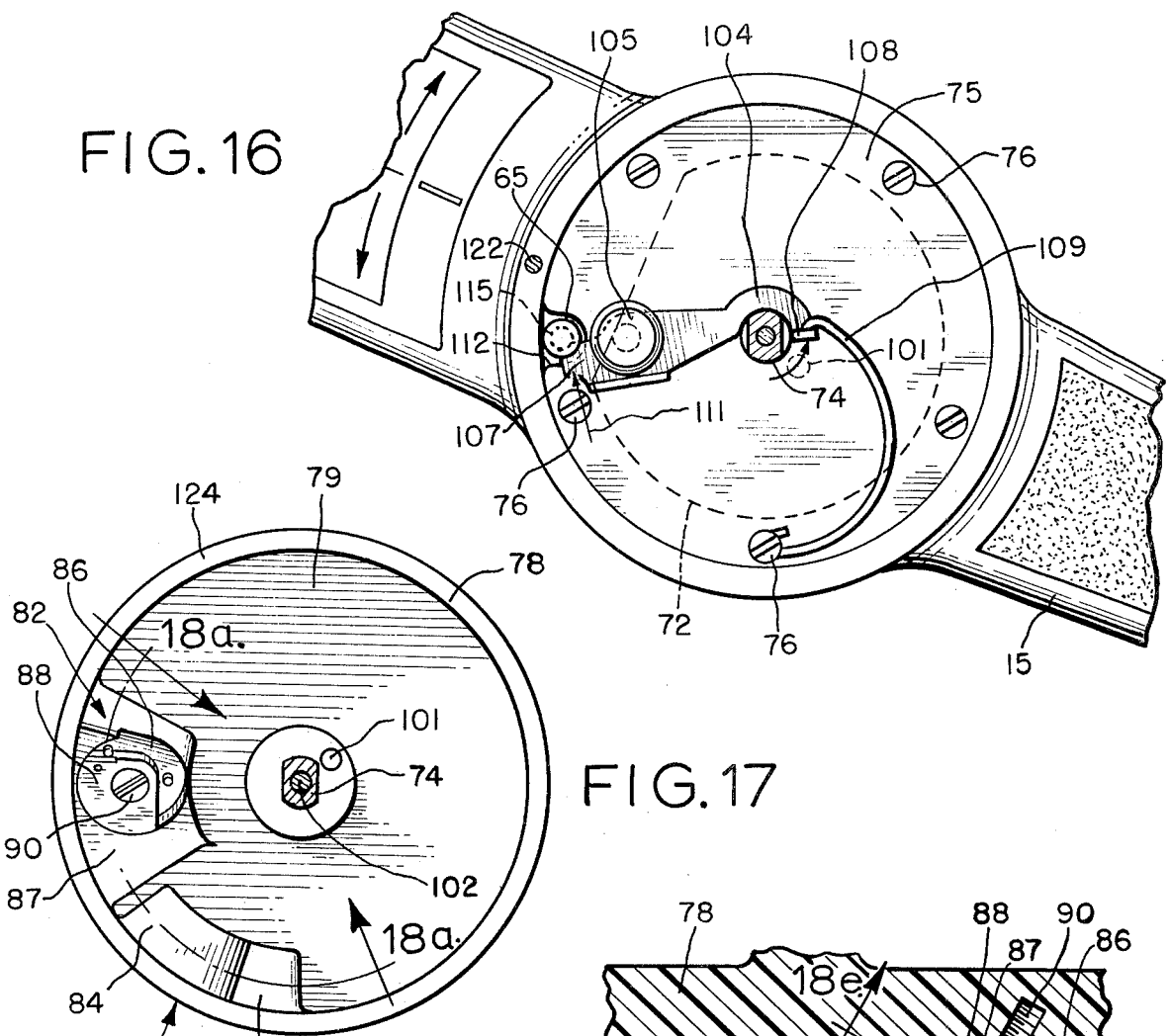
FIG. 16
FIG. 17
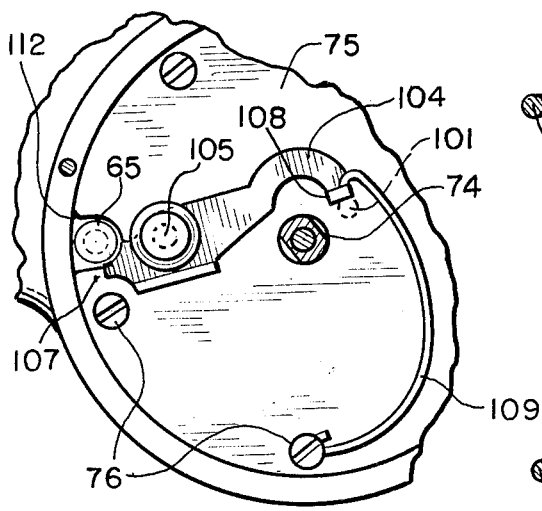
FIG. 18b
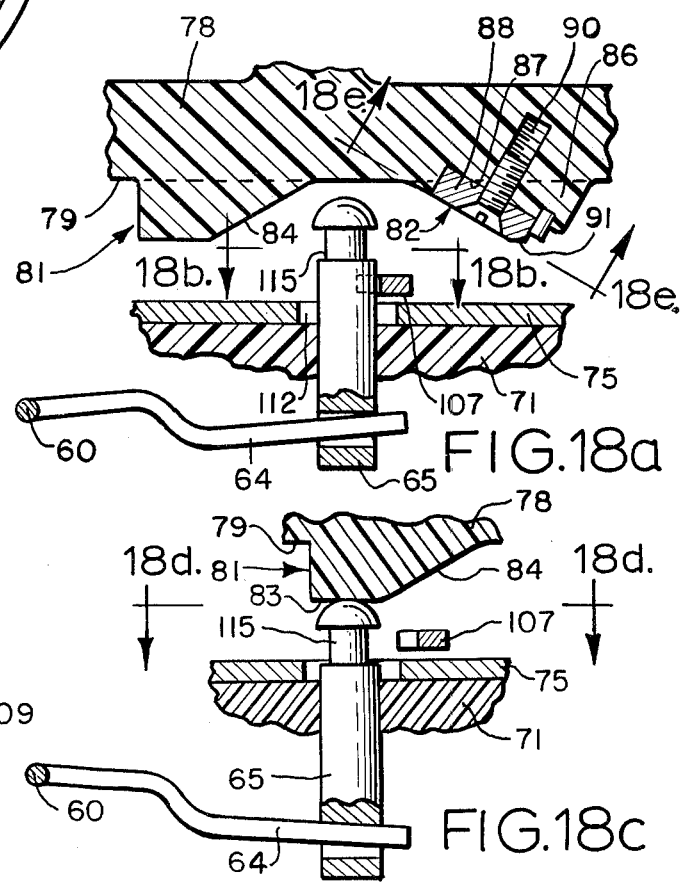
FIG. 18a
FIG. 18c

PRESSURE COOKER

BACKGROUND OF THE INVENTION

This invention relates to pressure-cookers and more particularly to such pressure-cookers as are used in the home for preparation of foods for family consumption.

The use of steam under pressure to accelerate the cooking process and thereby reduce the cooking time is well known in the art. The utilization of pressure-cooking is well established in the commercial field of food preparation but has not gained comparable acceptance in the private area of home use. The deterrents to widespread use by housewives appears to be the danger of the pressure-cooker "exploding" and the inability to control the cooking time to avoid over-cooking the food.

The avoidance of excessive pressure as well as avoidance of pressure maintained too long is not a serious problem in commercial installations where such installations are normally permanent with gauges and meters and electrical circuitry. In the use of commercial pressure-cookers space and cost are not critical factors and experienced personnel are utilized to operate the equipment.

The need for a compact, portable pressure-cooker for home use that is safe to use, easy to operate and relatively inexpensive has not been adequately met by cookware suppliers.

Accordingly, it is the primary object of this invention to overcome these disadvantages and provide a pressure-cooker having the advantages described.

SUMMARY OF THE INVENTION

This invention contemplates a pressure-cooker comprising a cooking pot and a lid therefor, each having interrupted flange portions to provide a bayonet-type interconnection therebetween. Locking means formed in the flanges are effective when steam pressure of a relatively low predetermined value is present within the pressure-cooker. A sealing gasket disposed between the pot and the lid in the flange area has portions not supported by the flanges and exposed to the ambient atmosphere designed to rupture at pressure of a relatively high predetermined value thereby venting the pressure-cooker.

A pressure limiting valve disposed in the lid is normally in an open position thereby venting the pressure-cooker, and manually activated spring means are operatively disposed to move the pressure limiting valve to a closed position, said spring means imposing a load on the valve equivalent to steam pressure of the relatively high predetermined value.

A timing device is provided on the lid which is manually operated to selected time positions which in its operation moves a cam-latching mechanism to activate the spring means for loading the pressure limiting valve and maintaining said loading of the valve for a period of time comparable to the selected time position. Also as part of the timing device is a bimetallic element for frictionally restraining operation of the timer after setting at a selected time position until a predetermined heat value is present in the pressure-cooker.

DESCRIPTION OF THE DRAWINGS

FIG. 5 is a top plan view of the pressure-cooker with the lid removed to show the pot flanges.

FIG. 6 is an enlarged sectional view taken along lines 6—6 of FIG. 5.

FIG. 7 is a bottom plan view of the pressure-cooker lid.

FIG. 8 is an enlarged sectional view taken along lines 8—8 of FIG. 7.

FIG. 9 is an enlarged fragmentary view of the pressure-cooker showing the interconnected flanges of the lid and pot with portions broken away to illustrate the interlocking means formed in the flanges.

FIG. 10 is an enlarged fragmentary view similar to FIG. 9 showing the interlocking means in a different position.

FIG. 11 is an enlarged bottom plan view of the lid handle but removed from the lid.

FIG. 12 is a diagrammatic view in perspective showing the spring means for loading the pressure limiting valve of the pressure-cooker.

FIG. 13 is an enlarged sectional view taken along lines 13—13 of FIG. 11.

FIG. 14 is an enlarged sectional view taken along lines 14—14 of FIG. 11 with parts of the timer device broken away to show the cam mechanism.

FIG. 15 is an exploded perspective view of the timer device.

FIG. 16 is an enlarged top plan view of the timer device with the cover portion removed.

FIG. 17 is an enlarged bottom plan view of the cover portion of the timer device.

FIG. 18a is an enlarged fragmentary view similar to FIG. 14 but with parts broken away showing the cam mechanism in zero position.

FIG. 18b is a view taken along lines 18b—18b of FIG. 18a.

FIG. 18c is a view similar to FIG. 18a but showing the cam mechanism in a "manual" operative position.

FIG. 18e is an elevational view taken along lines 18e—18e of FIG. 18a.

FIG. 19d is a view taken along lines 19d—19d of FIG. 19a.

DESCRIPTION OF THE PREFERRED EMBODIMENTS

Figure 1:
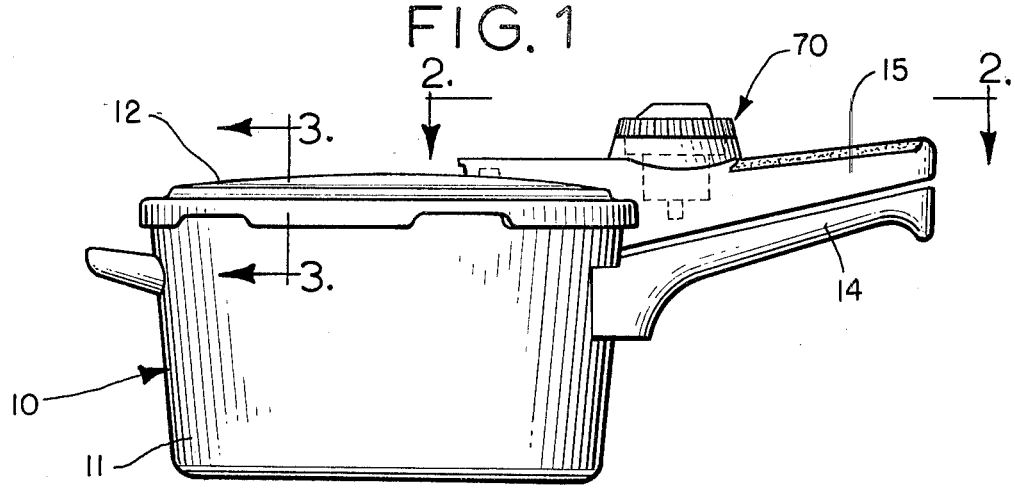
FIG. 1 is an elevational view of a pressure-cooker embodying the teachings of the invention set forth herein.

Referring now to the drawings and specifically FIG. 1, the reference numeral 10 indicates a pressure-cooker comprising a pot 11 and lid 12, each having a handle member 14 and 15, respectively, attached thereto. The handles 14 and 15 provide the means for manipulation of the pot and lid for interconnection in a manner to be described, and when such interconnection is effective the handles are aligned to provide a lifting and carrying means for the assembled pressure-cooker.

Figure 3:
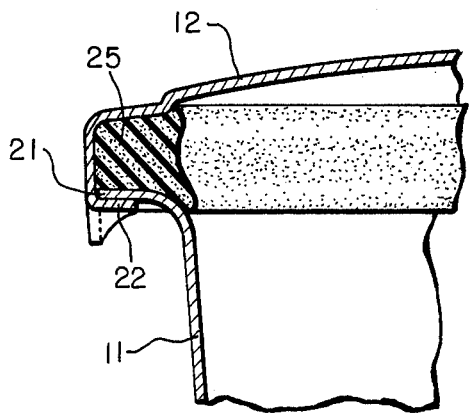
FIG. 3 is an enlarged sectional view taken along lines 3—3 of FIG. 1.

As shown in FIG. 5 the pot 11 has a flange 17 extending outwardly from the rim 18 of the pot formed to provide short and long portions 20 and 21, respectively. As shown in FIG. 7 the lid 12 has flange segments 22 extending inwardly from the rim 23 of the lid. The number and arrangement of the lid flange segments 22 are such that when the lid is placed upon the pot and said segments aligned with the short flange portions 20 the segments are disposed in a plane below the long flange portions 21 of the pot, whereupon relative rotation of the pot and lid will permit alignment of the lid flange segments with said long flange portions of the pot interconnecting said pot and lid. Such interconnection is well known in the art and is termed a "bayonet-like" connection. A resilient gasket ring 25 carried in the lid 12 and supported by the flange segments 22 is pressed upon the pot rim 18 by virtue of the described interconnection sealing said pot and lid, as seen in FIG. 3.

As shown in FIG. 6 one of the long portions 21 of pot flange 17 has a lanced portion 27 bent downwardly to provide a locking abutment 28 depending below the plane of the pot flange. As shown in FIG. 8 one of the flange segments 22 of the lid 12 is formed to provide a notch 29. When the lid 12 is placed upon the pot 11 as before described, relative rotation of said lid and pot moves the flange segments 22 to a position underlying the long portions 21. As illustrated in FIG. 9 such relative movement of the pot 11 and lid 12 as indicated by directional arrows 31 and 32, respectively, moves the notch 29 to positionment immediately below and aligned with the lanced portion 27. Compression of the gasket 25 between the lid 11 and the pot flange 17 produces an expansion force which urges intimate contact of the flange segments 22 to the underside of the long portion 21 of the pot flange 17. Thus, while the gasket resiliency will permit added compression in the area of the lanced portion 27 (as depicted in FIG. 9) once said lanced portion is aligned with the notch 27 the expansion force of the gasket produces an assembled condition as shown in FIG. 10. In such assembled condition the locking abutment 28 lies in the plane of the flange segment 22 and within the notch 29 thus preventing reverse relative rotation of the lid and pot. A pin 33 fixed to and depending from pot flange 17 is positioned to act as a stop to relative rotation of the lid and pot beyond the point where the locking arrangement described is effected. It should be noted that the described means for locking this particular interconnected flange portion and flange segment is located adjacent the pot and lid handles. Thus, squeezing the aligned handles of the pressure-cooker together places a downward force on the lid 12 through handle 15. When the steam pressure present within the pressure cooker is less than a certain relatively low value such downward force on the lid compresses gasket 25 moving the flange segment 22 downwardly so that notch 29 is below the plane of locking abutment 28 thereby permitting reverse relative rotation of the lid and pot. Contrariwise, when the steam pressure within the pressure cooker exceeds said certain relatively low value the gasket is not compressible and the squeezing of the aligned handles to move handle 15 downwardly merely flexes the top surface of the lid 12 to which handle 15 is secured.

With reference to FIG. 9 and as indicated by reference numeral 35, the gasket 25 has parts not supported by the flange portions 21 which are exposed to the ambient atmosphere. The design and composition of the gasket is such that when steam pressure within the pressure-cooker reaches a certain value the unsupported gasket parts 35 rupture or "blow-out" breaking the seal and venting the pressure-cooker.

Figure 2:
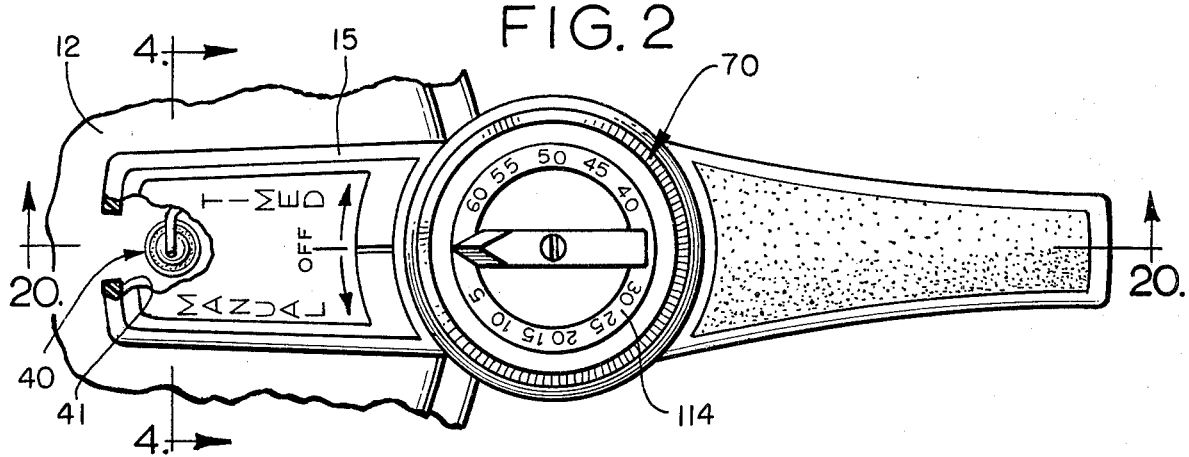
FIG. 2 is a fragmentary plan view taken along lines 2—2 of FIG. 1.
Figure 4:
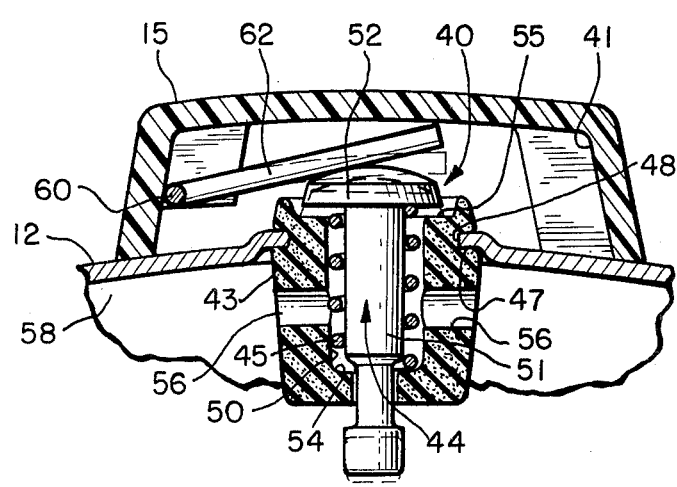
FIG. 4 is an enlarged sectional view taken along lines 4—4 of FIG. 2.

As can best be seen by referring to FIGS. 2 and 4 a pressure limiting valve 40 is mounted in the lid 12 positioned within a hollowed-out portion 41 of the lid handle 15. The pressure limiting valve 40 comprises a housing 43, a piston 44 and spring 45. The housing 43 is of cylindrical shape and formed from a resilient material whereby a groove 47 is adapted for a snap-fit and entrapment in a circular opening 48 of the lid 12. An axial bore 50 formed in said housing is sized to receive the spring 45 and the stem 51 of piston 44, said spring acting on the underside of the piston head 52 and the terminal wall 54 of the bore 50 to move the piston head upwardly and away from the seat 55 of the housing 43 thereby venting said bore to the ambient atmosphere. Radial passageways 56 place the housing bore 50 in communication with the pressure-cooker interior, indicated be reference numeral 58, whereby the pressure cooker is vented whenever the piston head 52 is away from the seat 55.

The pressure limiting valve 40 provides the only vent for the assembled pressure-cooker under normal circumstances and whether said valve is "open" or "closed" will determine the steam pressure characteristics of the pressure-cooker. As above described the pressure limiting valve 40 is "open" thereby venting the pressure cooker which allows the escape of steam that is generated during the cooking process. Under such circumstances the pressure-cooker functions in the same manner as a pot with a loose fitting lid for traditional cooking use. Contrariwise, if the pressure limiting valve 40 is "closed" whereby the pressure cooker is not vented, the steam generated during the cooking process is entrapped in the pressure cooker and will develop a steam pressure within the pressure-cooker.

As best seen in FIGS. 11 and 12 the means for interacting with the pressure limiting valve 40 to "close" said valve is the torsion spring 60. The torsion spring 60 is pivotally secured by bracket 61 to the underside of the lid handle 15, having one terminal arm 62 overlying and in contact with the top surface of the valve piston head 52 and the other terminal arm 64 secured to a cam follower pin 65. As will be more fully described later downward movement of the pin 65 will be translated through the torsion spring 60 to cause the spring arm 62 to press downwardly on piston head 52.

As illustrated by dotted lines in FIG. 4, when the downward pressure on the piston head is sufficient to overcome the tension of spring 45 the piston 44 is moved downwardly so that the piston head 52 is positioned on valve seat 55, whereupon the valve bore 50 is no longer vented to the ambient atmosphere. Until and unless the pin 65 is moved upwardly the tension of the torsion spring 60 will continue to be exerted through arm 62 upon the piston head 52 urging the maintenance of the valve to a "closed" position.

In such "closed" position the valve no longer acts to vent the pressure-cooker and steam generated by the cooking process within the pressure-cooker will be entrapped therein. When and if the steam pressure developed in the pressure-cooker is of sufficient value, acting on the underside of the piston head 52, to overcome the tension value of the torsion spring 60 the piston 44 will move upwardly to the position shown in solid lines in FIG. 4 whereby the pressure-cooker will be vented. Obviously, in the condition described, whenever the steam pressure in the pressure-cooker drops to a value less than the tension value of the torsion spring the piston will move downwardly to a "closed" position, and in this respect the valve may open and close intermittently to maintain a predetermined pressure. Equally obvious, under the conditions described the tension value of the torsion spring determines the value of steam pressure that can be developed within the pressure cooker. Thus, the torsion spring would have a predetermined tension value calibrated in accordance with the relative positions of the spring arms 62 and 64. For the purpose of the present invention it is sufficient that the pin 65 have an upper or inoperative position when the valve is open and a lower or operative position when the valve is closed.

The manipulation of the cam follower pin 65 to effect closing of the pressure limiting valve 40 is accomplished within the timer device indicated by reference numeral 70, which is a part of the lid handle 15 as shown in FIGS. 1 and 2. FIG. 15 which is an exploded view of the timer device shows the component elements which, as will now be described, operate to regulate the positionment of the cam follower pin 65.

The lid handle 15 is formed to provide a circular housing 71 in which is disposed a timer mechanism 72 having a drive shaft 74. The timer mechanism, as such, does not constitute a part of the present invention and may be of any well known construction known in the art which provides a spring biased rotatable drive shaft designed to rotate at a known and calibrated speed. A mounting plate 75 secured in the housing as by screws 76 confines the timer mechanism permitting protrusion of the drive shaft therethrough for connection to and operation of a timer indicator 78.

As shown in FIG. 17 the timer indicator 78 has, in general, a flat undersurface 79 with first and second cam surfaces 81 and 82, respectively, depending therefrom and located adjacent the periphery of said indicator. The first cam surface or "manual" cam 81 has an ultimate surface 83 disposed in a plane distant from the indicator undersurface 79 equal to the distance of movement determined for the cam follower pin 65, and an inclined camming surface or ramp 84 connecting said undersurface and said ultimate surface.

The second cam surface or "timed" cam 82 has an ultimate surface 86 disposed in a plane distant from the indicator undersurface slightly less than the distance of movement determined for the cam follower pin 65, for purposes to be explained. An inclined camming surface or ramp 87 connecting said undersurface 79 and said ultimate surface 86 has a displaceable cam segment 88 pivotally mounted thereon as by means of screw 90. As best seen by referring to FIG. 18e the cam segment 88 is quadrant shaped having straight sides 91 and 92 and a biasing spring 94 having one end 95 connected to said segment and the other end 96 connected to the inclined camming surface 87. Stop pins 98 and 99 extend outwardly from the inclined camming surface 87 and are located adjacent the cam segment sides 91 and 92, respectively, to limit pivoting movement of the cam segment. For a purpose to be described more fully later the cam segment 88 is urged by biasing spring 94 to the position shown in FIG. 18e whereby the cam segment surface 91 extends beyond the ultimate surface 86 of the "timed" cam 82, as shown in FIG. 18a.

In addition to the "manual" cam 81 and the "timed" cam 82 depending from the indicator undersurface 79 at the periphery thereof, a latch release pin 101 depends from said indicator undersurface and is located centrally in the proximity of the timer mechanism drive shaft 74 to which the timer indicator 78 is secured by set screw 102.

Referring now to FIG. 16 there is shown a latch member 104 pivotally mounted on the mounting plate 75 by stud 105 having a latching element 107 at one end thereof and a release element 108 at the other end thereof. The release element 108 is connected by hair spring 109 to a mounting screw 76 whereby the latch member 104 is biased in a clockwise direction urging the latching element 107 in the direction of arrow 111 and into contact with cam follower pin 65 which is journalled in the lid handle 15 and protrudes through the mounting plate 75 by means of opening 112.

FIG. 14 illustrates in assembled condition the relationship of the cams 81 and 82, the cam follower pin 65, the latch member 104, and the torsion spring 60 collectively called the "cam mechanism" in an inoperative or "off" position. The "off" position as seen by referring to FIG. 2 is equivalent to a "zero" position of the timer indicator 78 as represented by the indicia of minutes imprinted thereon and designated by reference numeral 114. In the following description of the operation of the timer device and the rotation of the timer indicator from an "off" or "zero" position, explanations in terms of "clockwise" or "counterclockwise" will be in reference to the illustration of FIG. 2. Thus clockwise movement of the indicator from the "zero" position will effect operation by means of the "timed" cam, whereas counter-clockwise movement of the indicator from the "zero" position will effect operation by means of the "manual" cam.

Referring now to FIGS. 18a and 18b the "cam mechanism" is shown in a "zero" position. The cam follower pin 65 is in its uppermost or inoperative position, held there by the force of the pressure limiting valve spring 45 acting through the piston 44 and the torsion spring 60. In such "zero" position the latch release pin 101 is in contact with latch release element 108 and acts as a stop to prevent clockwise movement of the latch member 104.

Figure 18D:
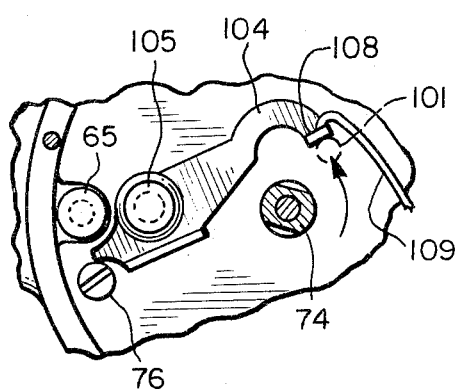
FIG. 18d is a view taken along lines 18d—18d of FIG. 18c.
Figure 18E:
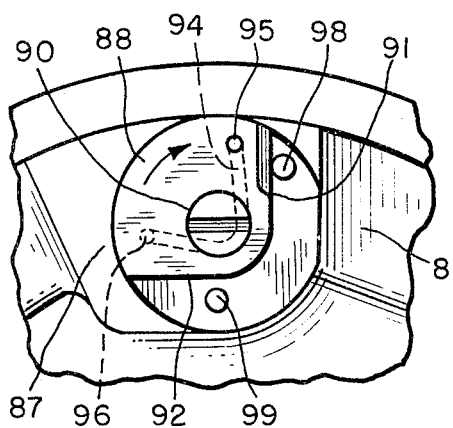

Referring to FIGS. 18c and 18d the timer indicator 78 has been rotated counter-clockwise to effect operation of the "cam mechanism" by means of the "manual" cam 81. Such rotation causes ramp 84 to move the cam follower pin 65 downward to the ultimate surface 83 thereby displacing torsion spring arm 64 and stressing the torsion spring 60, and through torsion spring arm 62 acting on piston 44 to "close" the pressure limiting valve 40 as previously described. Such rotation also causes counter-clockwise movement of the latch release pin 101 which in turn causes pivoted movement of the latch member 104 into abutment with a mounting screw 76 which acts as a stop member. In such "manual"

position the pressure limiting valve is closed permitting the generation of steam pressure in the pressure-cooker, and until the indicator is returned to "zero" position permitting upward movement of the cam follower pin to remove the stress on the torsion spring, the pressure limiting valve will only open when the steam pressure exceeds the tension value of the torsion spring.

Figure 19A:
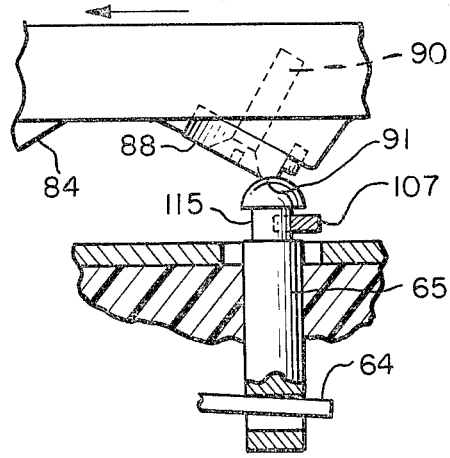
FIG. 19a is a view similar to FIG. 18a but showing the cam mechanism in an "automatic" operative position.

Referring to FIG. 19a the timer indicator 78 has been rotated clockwise to effect operation of the "cam mechanism" by means of the "timed" cam 82. It should be noted that clockwise rotation of the indicator acts through the drive shaft 74 to activate the spring biased timer mechanism 74 for automatic return of the indicator to a "zero" position at a calibrated speed. Such clockwise rotation causes ramp 87 to move the cam follower pin 65 downward to the cam segment surface 91 thereby stressing the torsion spring 60 in the manner previously described for the "manual" cam and to "close" the pressure limiting valve 40. Such clockwise rotation of the timer indicator also moves the latch release pin 101 out of contact with the latch release element 108 and thus no longer inhibits the pivoted movement of the latch member 104 as influenced by hair spring 109 (see FIG. 19d). The bias of hair spring 109 to pivot the latch member 104 in a clockwise direction moves the latching element 107 into the groove 115 of the cam follower pin 65 when said pin is fully depressed to an operative position.

Figure 19B:
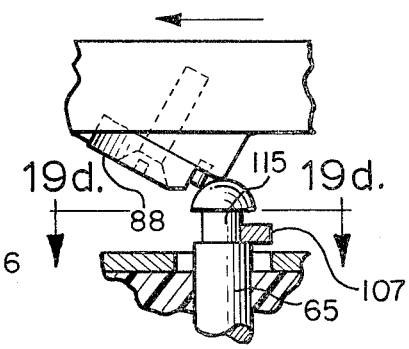
FIG. 19b is a view similar to FIG. 19a but showing the cam mechanism in an advanced inoperative position.

As shown in FIG. 19b, as clockwise rotation of timer indicator 78 continues the cam segment surface 91 is moved out of contact with the cam follower pin 65 and the movement of said pin upward under the stress of the torsion spring 60 is prevented by reason of the latching element 107 disposed in groove 115. This latching technique is critical when utilizing the timer mechanism 72 since the tension value of the torsion spring 60 would urge the cam follower pin against a continuous cam surface with such force that the timer mechanism spring would not be effective to return the indicator to "zero" position. Even if the timer mechanism had spring means, or other power means, to overcome the force of the torsion spring, the fictional drag imposed on a continuous cam surface by the cam follower pin would produce a variance which would result in erratic timing mechanism operation. Thus, the cam segment surface 91 having acted upon cam follower pin 65 to move said pin downward to an operative position closing the pressure limiting valve 40, the latch member 104 pivots to dispose latching element 107 in groove 115 maintaining said pin in said operative position without the necessity of continuing contact with "timed" cam 82. Continued clockwise rotation of the timer indicator 78 to a selected time period (as represented by the indicia 114) is accomplished with no further interaction of the cam mechanism components.

Figure 20:
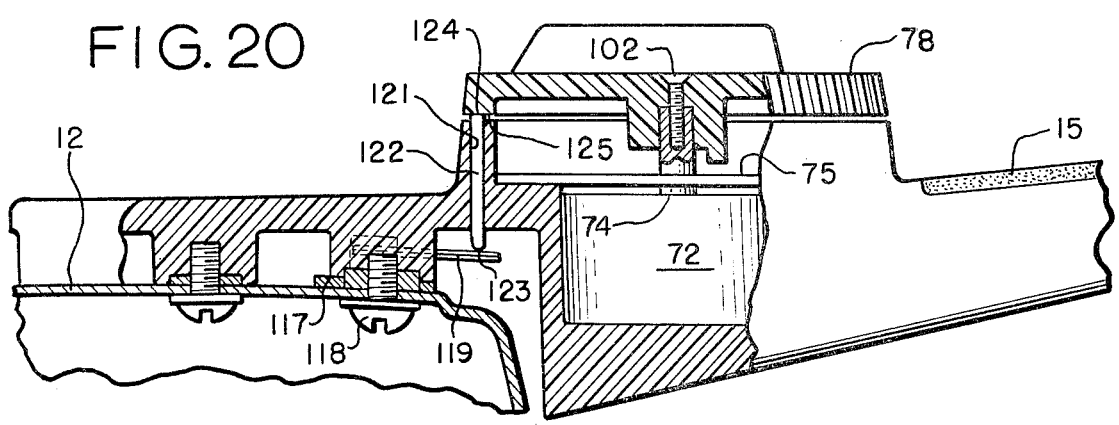
FIG. 20 is a sectional view taken along lines 20—20 of FIG. 2.

Referring now to FIGS. 11 and 20 a bracket 117 secured to the underside of lid handle 15 as by bolt 118 has a laterally extending bimetallic element 119 disposed underly a cylindrical bore 121 in which is disposed a cylindrical drag pin 122. The drag pin 122 has a lower terminal portion 123 which abuts the bimetallic element 119 and an upper terminal portion 124 which abuts the underside of the timer indicator 78 at its periphery as designated by reference numeral 125.

As shown, the bimetallic element 119 is normally stressed to provide an upward thrust against the drag pin lower terminal portion 123 which in turn presses the drag pin upper terminal portion 124 against the underside of the timer indicator 125. The stress of said bimetallic element exceeds the value of the spring tension of the timer mechanism and thus the drag pin 122 frictionally holds the timer indicator from counter-clockwise unwinding to return to "zero" position. However, the bimetallic element 119 responds to a rise in heat value within the pressure-cooker via bracket 117 and bolt 118, said bolt being exposed to the pressure-cooker interior 58 as shown in FIG. 13. The response of said bimetallic element to a given heat value increase moves the element downward, as indicated in dotted lines in FIG. 20, thereby permitting the drag pin 122 to drop by gravity from frictional engagement with the timer indicator, allowing the timer mechanism to operate under its own spring motivation.

With the timer mechanism energized by the clockwise rotation of the timer indicator 78 to a selected time period, the release of the drag pin permits the counter-clockwise movement of the timer indicator to return the timer indicator to a "zero" position. As shown in FIG. 19b the cam segment surface 91 which moved the cam follower pin 65 to an operative and latched position as previously described is positioned to as to interfere with the cam follower as the timer indicator rotates counter-clockwise. This position of interference is due to the difference in the width of groove 115 and the width of latching element 107 and the fact that the stress tension of torsion spring 60 is acting to move the cam follower pin 65 to its upper limit. Thus, the difference in widths of the groove and latching element to assure free and positive movement of said latching element in and out of said groove results in a slight movement upward of the cam follower pin 65 when it is no longer depressed by cam surface 91.

Figure 19C:
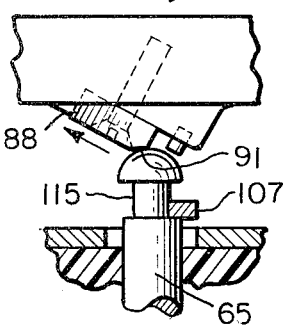
FIG. 19c is a view similar to FIG. 19a but showing the cam mechanism is a "release" position.
Figure 19D:
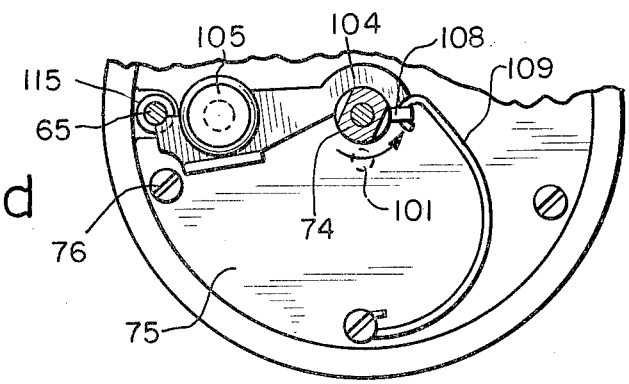

The energy value of the timer mechanism is not sufficient to utilize the cam segment surface 91 to depress cam follower pin 65 against the stress tension of torsion spring 60 as the timer indicator 78 rotates counter-clockwise towards "zero" position. Accordingly, and as best seen by referring to FIGS. 18e and 19c, the cam segment 88 is subject to pivotal displacement about screw 90 which moves cam segment surface 91 out of its position of interference with cam follower pin 65. The cam segment 88 biased by spring 94 to abutment with stop pin 98 is pivoted about screw 90 by cam follower pin 65 acting against cam segment surface 91, such pivoting being limited to abutment of cam segment surface 92 with stop pin 99. Inasmuch as the cam segment 88 is mounted on ramp 87 the pivotal movement of said cam segment permits displacement of the cam segment surface 91 in an upwardly direction as it moves against the cam follower 65, such displacement allowing the timer indicator 78 to continue its counter-clockwise rotation toward "zero" position.

As shown in FIG. 18b, when the timer indicator 78 reaches "zero" position the latch release pin 101 moves latch release element 108 pivoting latch member 104 about stud 105 and moving latching element 107 out of groove 115, whereby the cam follower pin 65 is no longer operative to stress torsion spring 60 and pressure limiting valve 40 opens to vent the pressure-cooker.

It should be understood that a proper cooking process is timed when the steam pressure in the pressure-cooker reaches a specified value, and that specified value does not develop until after the pressure limiting valve is closed sealing the pressure-cooker. This time delay in developing steam pressure of a specified value is variable and it is the purpose of the drag pin to prevent the start of the timer cycle until that specified value is attained. Obviously, steam pressure has a known relation to heat and thus a heat responsive delay device such as described can properly relate a specified value of steam pressure to the release of the timer indicator.

Having now described the invention, what is claimed is:

1. A pressure cooker comprising a pot and lid having locking means for interconnection of said pot and lid to provide a chamber, a pressure relief valve in said lid having a first valve spring operative to dispose said relief valve in an open position whereby the chamber is vented to the atmosphere and a second valve spring operative in opposition to said first valve spring to dispose the relief valve in a closed position whereby said chamber is not vented to the atmosphere, stress imposing means operably disposed to stress the second valve spring sufficiently to overcome the first valve spring and dispose the relief valve in a closed position, said stress imposing means comprising a timer device having a spring activated mechanism within a housing mounted on the cooker lid providing a drive shaft rotatable in one direction to load said spring for automatic reverse rotation of said drive shaft at a predetermined speed, an indicator secured to said drive shaft for manual rotation thereof in said one direction, said indicator having a cam surface thereon operative upon manual rotation of said indicator in said one direction to axially displace an associated cam follower, said cam follower being connected to the second valve spring whereby said axial displacement stresses said second valve spring, and means for maintaining the cam follower in axial displacement during automatic reverse rotation of the drive shaft.

2. A pressure cooker according to claim 1 wherein the means for maintaining the cam follower in axial displacement includes a latch member having a releasable interconnection with said cam follower.

3. A pressure cooker according to claim 2 wherein the latch member is characterized as being pivotally mounted on the timer device housing and being spring-biased toward the cam follower whereby a latch element formed on a terminal portion of said latch member is disposed within a circumferential groove formed in the cam follower.

4. A pressure cooker according to claim 3 wherein the latch member has a release element formed on a terminal portion thereof diametrically opposed to the latch element whereby a release pin extending from the indicator engages said release element and pivots the latch member in opposition to the spring-bias thereof to move said latch element out of disposition within the groove of the cam follower.

5. A pressure cooker according to claims 1, 2, 3 or 4 wherein the cam surface comprises an inclined camming surface extending from the indicator to termination in an ultimate cam surface, and the axial displacement of the cam follower is characterized as a positionment of said cam follower at a distance from said indicator greater than the distance of said ultimate cam surface from the indicator.

6. A pressure cooker according to claim 5 wherein the inclined camming surface includes a cam segment pivotally mounted thereon and being spring-biased to a position whereby a displaceable portion of said cam segment is disposed at a distance from the indicator greater than the distance of the ultimate cam surface from the indicator.

7. A pressure cooker according to claim 6 wherein the means for maintaining the cam follower in axial displacement includes resilient locking means whereby said cam follower is disposed at a distance from the indicator greater than the distance of the ultimate cam surface from the indicator and less than the distance of the displaceable portion of the cam segment from said indicator.

* * * * *